Patented Sept. 11, 1951

2,567,316

UNITED STATES PATENT OFFICE 2,567,316

PROCESS OF PRODUCING A SILICEOUS COMPOSITION AND THE COMPOSITION THEREOF

Auguste Florentin Bidaud, Serezin-du-Rhone, France, assignor to Societe des Usines Chimiques Rhone-Poulenc, Paris, France, a French body corporate No Drawing. Application July 16, 1947, Serial No. 761,433. In France March 10, 1947

4 Claims. (Cl. 106—287)

This invention relates to a process of producing siliceous composition of matter and the composition produced thereby having valuable waterproofing properties.

According to the present invention a process for the production of novel siliceous products comprises hydrolysing an organically substituted halogeno silane in the presence of finely divided anhydrous silicon oxide and separating the product, containing the silicon oxide, from the reaction mixture.

The silicon oxide is preferably employed in the form of an aerosal such as may be obtained by the combustion of a silicon compound, e. g. silicon chloride.

The process is readily carried out, it merely being necessary to subject the mixture of organically substituted halogeno silane and silicon oxide to the action of a hydrolysing agent, e. g. water, at room temperature or slightly above and, when the reaction is complete, to separate the products of hydrolysis, which are intimately associated with the silicon dioxide, from the excess of hydrolysing agent in which the products are insoluble. This separation can usually be effected merely by decanting the excess hydrolysing agent. By-products of the reaction which are not required in the final product, e. g. hydrohalic acids and volatile products, can be separated by any suitable method, e. g. evaporation, washing or neutralization, assisted if required by malaxation of the reaction mixture.

Particularly valuable products having excellent waterproof characteristics are obtained by employing organically substituted halogeno silanes which under normal hydrolysing conditions and in the absence of silicon dioxide would give liquid siloxanes. More especially there may be employed a mixture of organically substituted halogeno silanes such that on the average the molecule contains from 1.7 to 2.3 organic substituent groups per atom of silicon, i. e. by employing a mixture of di-organically-substituted halogeno silane with mono or poly substituted halogeno silane. The organic substituent groupings may be, for example, methyl, ethyl or higher alkyl or substituted alkyl, e. g. benzyl. Dimethyl halogeno silanes, by reason of their low carbon content, yield products which are not only waterproof but are inflammable only at high temperatures. Dimethyl dichlor-silane, which is readily available, is an excellent starting material.

The consistency of the products obtained from these substantially di-organically-substituted halogeno silanes varies with the quantity of silicon oxide present in the final product, becoming more solid as the silicon oxide content is greater. Thus, for example, waterproof products which contain 15 to 25% of anhydrous silicon oxide have the consistency of petroleum jelly while products which contain 5 to 10% of silicon oxide are fluid, and products containing greater quantities of silicon dioxide, such as 40 to 60%, are thickly liquid or hard.

The final products are suitable for technical uses in their original state and also constitute starting products for further conversion.

Waterproof products having a greasy consistency which are prepared from pure or crude dimethyl-dichlorsilane are suitable for protecting electric junctions or conductors (electric wires or parts of electric apparatus) from moisture. Products containing large quantities of silicon oxide of the order of 40 to 60%, which are thickly liquid or hard masses, are suitable for use, for example, as mastics for joints. Products obtained from dibenzyl dichlorsilane (having a high silicon oxide content) are suitable for incorporation in various plastics (e. g. cellulose acetate, polyvinyl acetal and the like).

Products obtained by hydrolysis of pure dimethyl dichlorsilane in the presence of a large quantity (50% or more) of silicon oxide constitute masses suitable for conversion into plastics by further treatment, such as products which become elastic under the action of heat.

The following examples serve to illustrate the invention but are not to be regarded as limiting it in any way:

*Example I*

To 37 parts by weight of finely divided silicon oxide obtained by the combustion of silicon chloride are added 322 parts of dimethyl dichlorsilane obtained by the reaction of 2.1 molecules of methylmagnesium chloride on one molecule of silicon tetrachloride. The silicon oxide is waterproofed by this contact. 140 parts of water are then gradually added to the anhydrous mass with mixing, which at first produces an evolution of hydrochloric acid resulting from the hydrolysis of the dimethyl dichlorsilane. Finally, there remains a strongly acid aqueous medium impregnating a somewhat fluid cream. After being left to stand, this acid aqueous medium is separated by decanting. The residual creamy product (about 214 parts) is then heated under vacuum at 150° C., or better at 250° C., in order to free it from the residual acid aqueous medium and of the products volatile under these conditions.

The dried product has the appearance of a rather firm paste or gel which is converted by malaxation into a homogeneous waterproof product having the appearance of petroleum jelly, which remains in this state when left to stand. This product is very suitable for protecting electric junctions against moisture. It may be dispersed in organic solvents (such as hydrocarbons), in which case it gives stable colloidal solutions.

*Example II*

The operation described in Example I is repeated, but the mass is left for three days after hydrolysis. The acid aqueous medium is thereafter separated and the mass is washed by malaxation with a mixture of water and methyl alcohol containing a fifth of its volume of ammonia. It is then twice washed with water, after which it is dried by progressive heating to 250° C. in vacuo. There remains a gel which is firmer than that obtained in Example I and which becomes gradually fluid under malaxation and finally gives a waterproof product having the appearance of petroleum jelly. This product is very suitable for protecting electric conductors against moisture. When spread on and left, this highly thixotropic product is converted into a cohesive gel having adhesive properties, which holds dust to a less extent than a non-thixotropic product.

It is to be noted in connection with this example that under the same conditions the dimethyl dichlorsilane employed gives, in the absence of silicon oxide, siloxanes of which the portion non-volatile at 250° C. under a vacuum of 3 mm. represents less than 50% of the siloxanes which can theoretically be obtained, expressed as $(CH_3)_2SiO$, while in the presence of silicon oxide the proportion of siloxanes obtained is more than 75% of the theoretical yield.

Although in the description and examples hereinbefore given the use of di-substituted halogeno silanes as starting substance has been more particularly mentioned, it must be understood that the process according to the invention is applicable to halogeno silanes containing any number of organic substituents.

I claim:

1. A process for the production of novel siliceous products of pasty consistency which comprises hydrolysing a mixture of methyl substituted halogeno silane such that on the average the molecule contains from 1.7 to 2.3 organic substituted groups per atom of silicon, in the presence of an aerosol of finely divided anhydrous silicon oxide produced by the combustion of a silicon compound, and separating the hydrolysis products, containing the silicon oxide, from the reaction mixture, the proportion of silicon oxide employed constituting 15 to 25% by weight of the hydrolysis products.

2. A process for the production of novel siliceous products which comprises hydrolyzing a methyl-substituted chlorosilane containing 1.7 to 2.3 methyl groups per silicon atom in the presence of an aerosol of finely divided anhydrous silicon oxide produced by the combustion of a silicon compound and separating the hydrolysis products, containing the silicon oxide, from the reaction mixture, the proportion of silicon oxide employed constituting 15 to 25% by weight of the hydrolysis products.

3. A waterproof siliceous product consisting of finely divided silicon oxide intimately associated with the hydrolysis products of a methyl-substituted chlorosilane containing 1.7 to 2.3 methyl groups per silicon atom, the said silicon oxide constituting more than 15% but less than 25% by weight of the product, when made by the process of claim 1.

4. A waterproof siliceous product consisting of finely divided silicon oxide intimately associated with the hydrolysis products of a methyl-substituted chlorosilane containing 1.7 to 2.3 methyl groups per silicon atom, the said silicon oxide constituting more than 15% but less than 25% by weight of the product, the said product having the consistency of petroleum jelly, when made by the process of claim 1.

AUGUSTE FLORENTIN BIDAUD.

REFERENCES CITED

The following references are of record in the file of this patent:

UNITED STATES PATENTS

| Number | Name | Date |
|---|---|---|
| 2,428,608 | Bass | Oct. 7, 1947 |
| 2,460,795 | Warrick | Feb. 1, 1949 |